Aug. 21, 1928.
E. P. DU PONT
1,681,224
BRAKING MECHANISM FOR AUTOMOBILES
Filed April 11, 1927    2 Sheets-Sheet 1
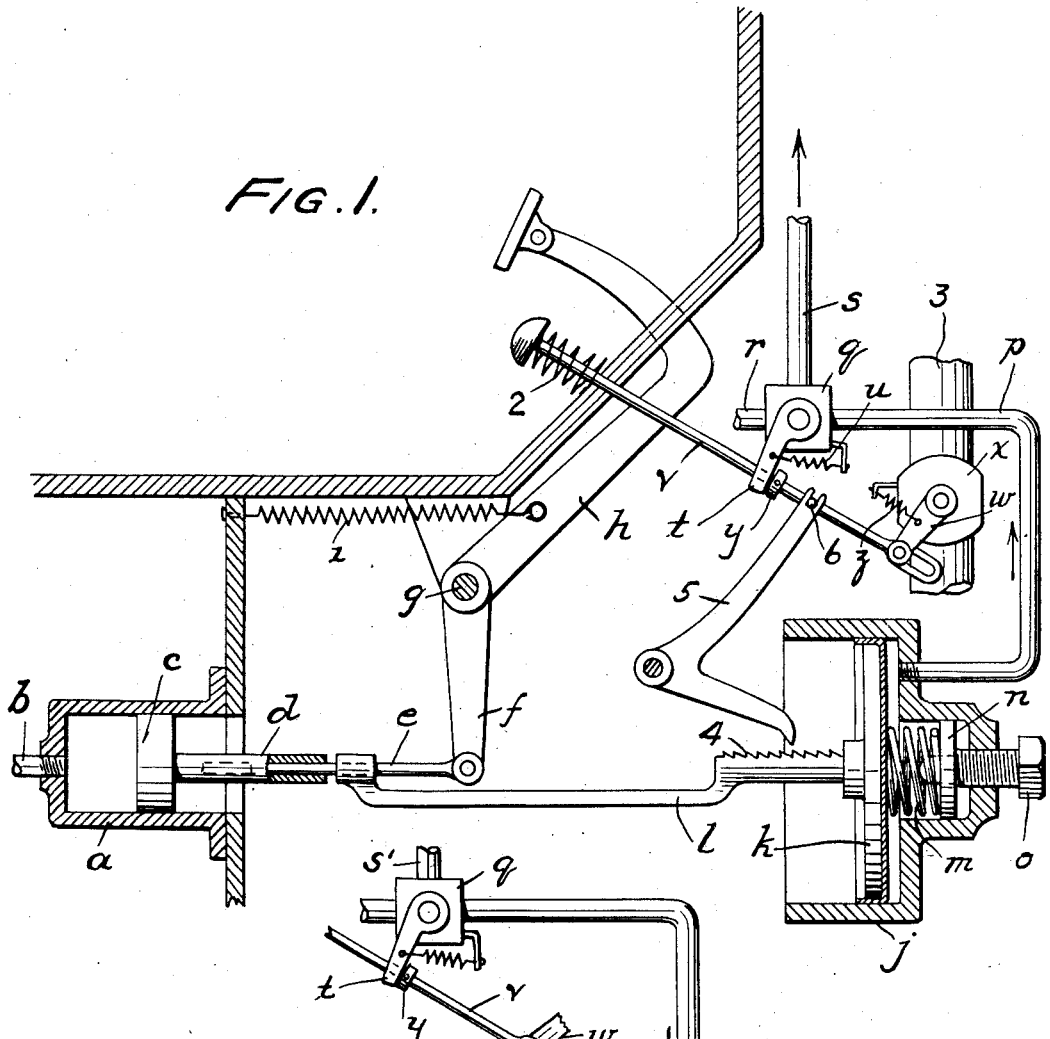
INVENTOR
Eleuthere Paul du Pont Patented Aug. 21, 1928.

1,681,224

UNITED STATES PATENT OFFICE.

ELEUTHERE PAUL du PONT, OF MONTCHANIN, DELAWARE.

BRAKING MECHANISM FOR AUTOMOBILES.

Application filed April 11, 1927. Serial No. 182,581.

My invention relates to an improvement in braking mechanism for automobiles and more particularly to mechanism so arranged as to act automatically to apply the brakes on an automobile to an extent sufficient to substantially retard its speed when the engine throttle is closed.

In the operation of an automobile of usual construction and having a fast throttle or accelerator, by which the supply of fuel from the carbureter to the engine is controlled, it is necessary when the speed of the automobile is to be retarded for the operator to move his foot, usually his right foot from the accelerator to the brake pedal and back to the accelerator when the automobile is reaccelerated. Such movement of the foot of an operator from the accelerator to the brake pedal and back to the accelerator is exceedingly fatiguing when the automobile is operated in traffic where even though the automobile may not be brought to a dead stop with excessive frequency, it is necessarily almost constantly being retarded or accelerated, requiring movement of the operator's foot with excessive frequency.

Now it is the object of my invention to provide means whereby on the closing of the engine throttle of an automobile the brakes may be automatically applied to an extent sufficient to retard the speed of the automobile to a degree to which it would be normally retarded by manual operation of the brakes, as when running in traffic, approaching corners, etc.

Having now indicated, in a general way, the nature and purpose of my invention, I will proceed to a detailed description thereof with reference to the accompanying drawings in which there has been illustrated preferred embodiments and in which:—

Fig. 1 is a diagrammatic illustration of an embodiment of my invention as applied to an automobile.

Fig. 2 is a diagrammatic illustration of a modification of the embodiment of my invention illustrated in Fig. 1.

Figure 3:
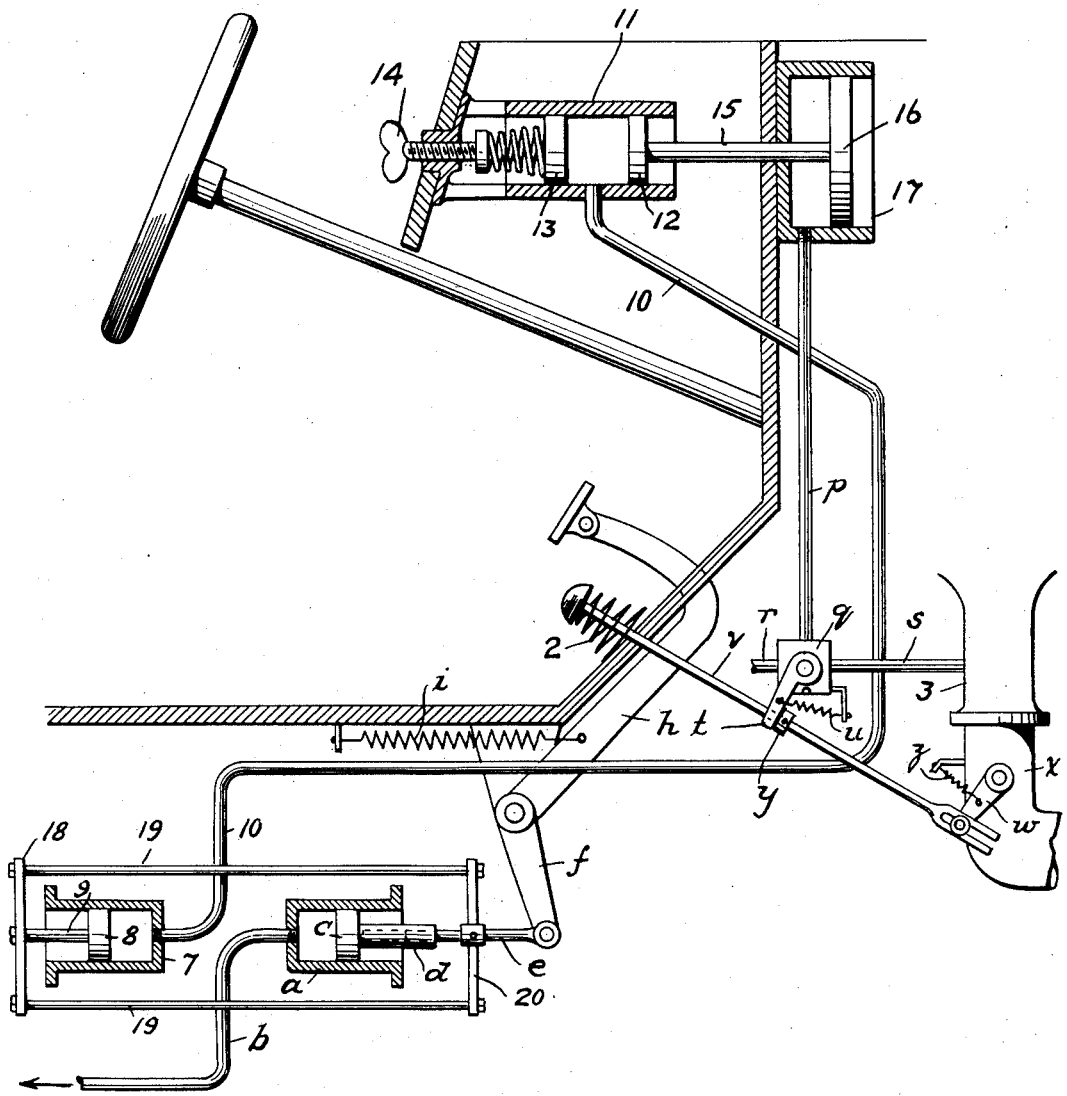
Fig. 3 is a diagrammatic illustration of a further modification of my invention.

Referring more particularly to Fig. 1, $a$ indicates the cylinder of a hydraulic brake system such as is provided in automobiles equipped with hydraulic brakes. The cylinder $a$ is adapted to contain the brake actuating fluid and is connected with the brake actuating mechanism at the wheels through connection to a conduit $b$. Within the cylinder $a$ is a piston $c$ adapted to be actuated through the medium of a piston rod $d$ to put compression on the fluid in the cylinder for the actuation of the brakes.

A rod $e$, one end of which extends within a bore formed in the piston rod $d$ and is connected at its other end to an arm $f$ secured on a cross shaft $g$ to which is secured a brake pedal $h$. When the brake pedal $h$ is depressed, as will be observed, the piston will be moved into the cylinder causing the brakes to be applied, while on release of the pedal, which is returned by a spring $i$, the fluid in the cylinder will return the piston which is free to return due to the retraction of the end of rod $e$, and return to normal the pedal $h$. Thus, it will be understood that the piston $c$ may be actuated without moving the pedal $h$, provided that pressure is applied to the piston rod $d$.

Suitably supported in the chassis of the automobile is a cylinder $j$, within which is a piston $k$, provided with a piston rod $l$, the end of which is slidably mounted on the rod $e$ and adapted to slide thereon into engagement with the end of the piston rod $d$. Bearing against the front of the piston $k$ is one end of a spring $m$, the other end of which bears against an abutment $n$ adjustable by means of a screw $o$. The spring $m$ tends to move the piston $k$ outwardly in the cylinder $j$ and to cause the piston rod $l$ to engage the piston rod $d$ and move the piston $c$ in the cylinder $a$ to effect application of the brakes.

The forward end of cylinder $j$ is connected through a conduit $p$ with a valve casing $q$, with which is connected a conduit $r$ leading to atmosphere and a conduit $s$ leading to a source of vacuum of an engine. Within the casing $q$ is a three way valve, adapted to be actuated by an arm $t$, by which the conduit $p$ and the forward end of cylinder $j$ may be connected either with the vacuum or with atmosphere. A spring $u$ connected to the arm $t$ and casing $q$ tends to hold the arm in such position that the valve will be positioned to connect the conduit $p$ with the conduit $s$ and hence put the forward end of cylinder $j$ under vacuum. The degree of vacuum under which the forward end of cylinder $j$ is put is sufficient to overcome the tension of spring $m$, so that as will be observed from an inspection of Fig. 1, the spring $m$ is rendered inoperative to effect application of the brakes through actuation of piston $o$.

The arm $t$ is so arranged that the accelerator $v$, which is connected by a slot and pin connection to an arm $w$ on the butterfly valve of the carbureter $x$, passes through it. A stop $y$ is secured to the accelerator in such a position, that, when arm $w$ is in the position which it assumes under the influence of a spring $z$, when the butterfly valve is closed, it will contact with arm $t$ and on further movement of the accelerator, under the influence of spring 2 and which is permitted by its slot and pin connection with the arm $w$, will cause the arm $t$ to be moved to shift the valve in casing $q$ to connect conduit $p$ with atmosphere through conduit $r$.

When conduit $p$ is connected with atmosphere the vacuum in cylinder $j$ is satisfied and spring $m$ may move piston $k$ and rod $l$ with the result that piston $c$ is actuated and the brakes applied.

It will now be observed that so long as the accelerator is depressed, as when an automobile is being driven under power, or so long as it is not permitted to move under the influence of spring 2 necessary to close the butterfly valve of carbureter $x$, the cylinder $j$ will be connected with vacuum and the spring $m$ will be effective to cause an application of the brakes. However, when the automobile is being operated in traffic, where on shutting off the power it is almost always necessary to apply the brakes, the accelerator $v$ is permitted to move under the influence of spring 2 after the butterfly valve is closed with the result that through the contact of stop $y$ with arm $t$ the valve in casing $q$ is moved to shut off conduit $s$ and connect conduit $p$ with atmosphere, thus satisfying the vacuum in cylinder $j$ and permitting spring $m$ to actuate piston $k$ and piston rod $l$ for the actuation of piston $c$ to effect application of the brakes.

As will be obvious, the spring $m$ may be adjusted by manipulation of screw $o$, so that a desired degree of braking will be effected. For example, the braking should be such as to slowly bring the automobile to a stop which will suffice for all ordinary purposes and which will enable the automobile to be driven ordinarily without any necessity for the operator to utilize the brake pedal $h$, thus permitting the operator's foot to remain on the accelerator.

Since the most convenient source of vacuum with which conduit $s$ may be connected is the intake manifold 3 of the engine of the automobile and since when the engine is operated with a full, or substantially full, open throttle, the vacuum drops, it is possible that at times the vacuum so provided on conduit $p$ will be insufficient to overcome the tension of spring $m$. In order to avoid an application of the brakes in such case, the piston rod $l$ of piston $k$ is provided with ratchet teeth 4 and a lever 5, one end of which is notched and engages a pin 6 on the accelerator and the other end of which is so positioned as to engage with one or another of the ratchet teeth 4 on depression of the accelerator, which results in moving of the lever to fully open the throttle. The engagement of lever 5 with teeth 4 will prevent movement of piston $k$ under the influence of spring $m$ irrespective of the degree of vacuum on cylinder $j$.

Referring now more particularly to Fig. 2, the modification shown differs from the embodiment shown in Fig. 1 only in that the conduit $s'$ is connected with pressure from any suitable source instead of vacuum, with the result that the pressure is put on cylinder $j'$ through conduit $p'$. The pressure tends to move the piston $k'$ to effect a movement of piston $c$ through rod $l$ and is resisted by a spring $m'$, which serves on the release of pressure to move the piston $k'$ into the cylinder and permit release of the brakes. In the operation of the modification shown in Fig. 2, the three way valve in the casing is so positioned normally as to connect conduit $p'$ with atmosphere and is moved by contact of stop $y$ on accelerator $v$ with arm $t$ into a position to connect the conduit $p'$ with pressure in conduit $s'$.

Referring now more particularly to Fig. 3 a cylinder 7 within which is a piston 8 provided with a piston rod 9 is provided and connected through a conduit 10 with a cylinder 11, within which is a piston 12 and the head 13 of which is adjustable through the medium of a thumb screw 14. The cylinder 7, the cylinder 11 and the conduit 10 are filled with a fluid or liquid under a normally constant pressure. The piston 12 is provided with a piston rod 15, which is connected to a piston 16 in a cylinder 17. The cylinder 17 is connected through conduit $p$ to valve casing $q$ and may be connected through the valve therein with atmosphere through conduit $r$, or else through conduit $s$ connected to the intake manifold 3. The piston rod 9 of piston 8 is connected through a cross head 18 and rods 19 with a cross head 20 slidably mounted on rod $e$.

It will now be observed that if cylinder 17 be under atmospheric pressure or slight vacuum that a constant pressure will be maintained on the fluid or liquid in cylinder 11, conduit 10 and cylinder 17, which may be adjusted by manipulation of thumb screw 14. If now a vacuum be put on cylinder 17, or increased therein, piston 16 will be moved inwardly and will cause piston 12 to move inwardly to increase the pressure in cylinder 11. Increased pressure in cylinder 11 will pass through conduit 10 and into cylinder 7 causing the piston 8 to be moved. Movement of piston 8 will be transmitted to piston $c$ in cylinder $a$, through cross heads 18, 20 and rod 19 with the result that the brakes will be applied. The control of the vacuum in cylinder 17 is accomplished through the connection between the accelerator $v$ and the arm $t$ by which the three way valves in casing $q$ are operated.

It will now be observed that by virtue of my invention the brakes on an automobile may be applied automatically and without effort on the part of the operator, thus enabling an automobile to be operated in traffic without fatigue.

Having now fully described my invention, what I claim and desire to protect by Letters Patent is:—

1. The combination with an automobile provided with an engine and a brake, of manually operable means for applying the brake, an accelerator for controlling the fuel supply to the engine, and means operable by the accelerator for applying said brake independently of said manually operable means when the accelerator is actuated to shut off the supply of fuel to the engine.

2. The combination with an automobile provided with an engine and a brake, of manually operable means for applying the brake, an accelerator for controlling the fuel supply to the engine, and means operable by the accelerator for applying said brake to a predetermined degree independently of said manually operable means when the accelerator is actuated to shut off the supply of fuel to the engine.

3. The combination with an automobile provided with an engine and a brake adapted to be applied under the influence of fluid pressure, of a cylinder for fluid connected with the brake, a piston in said cylinder actuatable to effect application and release of said brake, a brake pedal, a connection between said pedal and said piston whereby said piston may be operated by said pedal to effect application of the brake, means independent of said brake pedal operative to actuate said piston to effect application of the brake, an accelerator pedal for controlling the supply of fuel to the engine and means controlled by the accelerator pedal for rendering said last mentioned means operative and inoperative.

4. The combination with an automobile provided with an engine and a brake adapted to be applied under the influence of fluid pressure, of a cylinder for fluid connected with the brake, a piston in said cylinder actuatable to effect application and release of said brake, a brake pedal, a connection between said pedal and said piston whereby said piston may be operated by said pedal to effect application of the brake, expanding means operatively connected with said piston whereby said piston may be operated, an accelerator and means controlled by said accelerator pedal for controlling the operation of said piston by said expanding means.

5. The combination with an automobile provided with an engine and a brake adapted to be applied under the influence of fluid pressure, of a cylinder for fluid connected with the brake, a piston in said cylinder actuatable to effect application and release of said brake, a brake pedal, a connection between said pedal and said piston whereby said piston may be operated by said pedal to effect application of the brake, a spring, a connection between said spring and said piston whereby said piston may be operated by said spring, an accelerator pedal for controlling the supply of fuel to the engine and means controlled by the accelerator for controlling the operation of said piston by said spring.

6. The combination with an automobile provided with an engine and a brake adapted to be applied under the influence of fluid pressure, of a cylinder for fluid connected with the brake, a piston in said cylinder actuatable to effect application and release of said brake, a brake pedal, a connection between said pedal and said piston whereby said piston may be operated by said pedal to effect application of the brake, a second cylinder, a piston in said second cylinder, means affording an operative connection between said piston and said first mentioned piston, a pressure means in operative relation with one side of the piston in said second cylinder and adapted to move said piston in one direction, a conduit affording a passage for fluid to said second cylinder.

In testimony of which invention, I have hereunto set my hand, at Montchanin, Delaware, on this fourth day of April, 1927.

ELEUTHERE PAUL du PONT.